US009964942B2

(12) United States Patent
Nelson et al.

(10) Patent No.: US 9,964,942 B2
(45) Date of Patent: May 8, 2018

(54) SYSTEM AND METHOD FOR MANUFACTURING CEMENTITIOUS BOARDS WITH ON-LINE BOARD MEASUREMENT

(71) Applicant: United States Gypsum Company, Chicago, IL (US)

(72) Inventors: Robert Nelson, Naperville, IL (US); Christopher Mark Pauly, Rolling Meadows, IL (US); Charles Whittington, Naperville, IL (US); Andrew Rowe, Evanston, IL (US)

(73) Assignee: United States Gypsum Company, Chicago, IL (US)

( * ) Notice: Subject to any disclaimer, the term of this patent is extended or adjusted under 35 U.S.C. 154(b) by 42 days.

(21) Appl. No.: 15/271,989

(22) Filed: Sep. 21, 2016

(65) Prior Publication Data

US 2017/0131701 A1     May 11, 2017

Related U.S. Application Data

(60) Provisional application No. 62/251,396, filed on Nov. 5, 2015.

(51) Int. Cl.
  *G05B 19/402* (2006.01)
  *C04B 11/00* (2006.01)
  (Continued)

(52) U.S. Cl.
  CPC ........ *G05B 19/402* (2013.01); *B28B 17/0081* (2013.01); *B28B 19/0092* (2013.01);
  (Continued)

(58) Field of Classification Search
  CPC ........ G05B 19/402; G05B 2219/49001; G05B 2219/45054; G01B 11/0691;
  (Continued)

(56) References Cited

U.S. PATENT DOCUMENTS 4,403,006 A   9/1983   Bruce et al.
4,420,295 A   12/1983  Clear et al.
(Continued)

FOREIGN PATENT DOCUMENTS

JP   H06-50751 A   2/1994

OTHER PUBLICATIONS

European Patent Office, International Search Report and the Written Opinion in International Application No. PCT/US2016/058387 (dated Mar. 6, 2017).
(Continued)

*Primary Examiner* — Nathan L Laughlin
(74) *Attorney, Agent, or Firm* — Leydig, Voit & Mayer, Ltd.; Philip T. Petti; Pradip K. Sahu

(57) ABSTRACT

Embodiments of a system and a method for continuously measuring cementitious board during the continuous manufacture thereof can be used in connection with the manufacture of various cementitious products, including gypsum wallboard, for example. Embodiments of a system and a method for continuously measuring cementitious board during its continuous manufacture can be used online in a continuous manufacturing process to effectively determine the degree to which cementitious slurry has set (e.g., expressed as percent hydration) at a predetermined location, such as, near a cutting station, for example. A height measuring system can be used to determine the relative amount the cementitious board sags as it passes over an unsupported span disposed between the forming station and the cutting station and to correlate the measured sag distance with a value of percent hydration of the cementitious slurry of that particular portion of the cementitious board.

20 Claims, 4 Drawing Sheets

(51) Int. Cl.
*B28B 17/00* (2006.01)
*B28B 19/00* (2006.01)
*G01B 21/32* (2006.01)
*G01B 11/06* (2006.01)

(52) U.S. Cl.
CPC .......... *C04B 11/00* (2013.01); *G01B 11/0608* (2013.01); *G01B 11/0691* (2013.01); *G01B 21/32* (2013.01); *G05B 2219/45054* (2013.01); *G05B 2219/49001* (2013.01)

(58) Field of Classification Search
CPC . G01B 11/0608; G01B 21/32; B28B 19/0092; B28B 17/0081; C04B 11/00
See application file for complete search history.

(56) References Cited

U.S. PATENT DOCUMENTS

| | | | |
|---|---|---|---|
| 4,626,389 A | 12/1986 | Lempfer et al. | |
| 5,198,052 A | 3/1993 | Ali | |
| 6,045,730 A | 4/2000 | Potter | |
| 6,815,049 B2 | 11/2004 | Veeramasuneni et al. | |
| 7,651,327 B2 | 1/2010 | Jallon et al. | |
| 7,722,964 B2 | 5/2010 | Utagaki et al. | |
| 8,100,226 B2 | 1/2012 | Cao et al. | |
| 8,142,914 B2 | 3/2012 | Yu et al. | |
| 9,341,600 B2 | 5/2016 | Cavaliero et al. | |
| 2004/0052297 A1 | 3/2004 | McDonald et al. | |
| 2004/0089393 A1 | 5/2004 | Watras | |
| 2008/0202415 A1 | 8/2008 | Miller et al. | |
| 2011/0011175 A1 | 1/2011 | Ichikawa et al. | |
| 2013/0338270 A1 | 12/2013 | Yu et al. | |
| 2017/0334089 A1* | 11/2017 | Rieder | B28B 3/04 |

OTHER PUBLICATIONS

"Application Note: Non-Contact Speed and Length Measurement of Gypsum Board," Beta LaserMike (2004) 2 pages.

Subramaniam et al., "Monitoring the setting behavior of cementitious materials using one-sided ultrasonic measurements," *Cement and Concrete Research* 35(5): abstract only (2005) 2 pages.

* cited by examiner

SYSTEM AND METHOD FOR MANUFACTURING CEMENTITIOUS BOARDS WITH ON-LINE BOARD MEASUREMENT

CROSS-REFERENCE TO RELATED APPLICATION

This patent application claims the benefit of priority to U.S. Provisional Patent Application No. 62/251,396, filed Nov. 5, 2015, and entitled, "System and Method for Manufacturing Cementitious Boards With On-Line Board Measurement," which is incorporated in its entirety herein by this reference.

BACKGROUND

The present disclosure relates to continuous cementitious board manufacturing processes and, more particularly, to a system and method for measuring the degree to which cementitious slurry has set at a predetermined point along the manufacturing line during its manufacture.

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677, for example. Typically, such gypsum-containing cementitious products are made by preparing a mixture of calcined gypsum (calcium sulfate alpha or beta hemihydrate and/or calcium sulfate anhydrite), water, and other components, as appropriate to form cementitious slurry. The cementitious slurry and desired additives are often blended in a continuous mixer, as described in U.S. Pat. No. 3,359,146, for example.

In a typical cementitious board manufacturing process such as gypsum wallboard, cementitious board is produced by uniformly dispersing calcined gypsum (commonly referred to as "stucco") in water to form aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. Aqueous foam can be combined with the aqueous calcined gypsum slurry in the mixer and/or in the discharge conduit. A stream of foamed slurry passes through the discharge conduit from which it is continuously deposited onto a moving web of cover sheet material (i.e., the face sheet) supported by a forming table. The foamed slurry is allowed to spread over the advancing face sheet. A second web of cover sheet material (i.e., the back sheet) is applied to cover the foamed slurry and form a sandwich structure of a continuous wallboard preform. The wallboard preform is subjected to forming, such as at a conventional forming station, to obtain a desired thickness.

The calcined gypsum reacts with the water in the wallboard preform to form a matrix of crystalline hydrated gypsum or calcium sulfate dihydrate and sets as a conveyor moves the wallboard preform down the manufacturing line. It is the desired hydration of the calcined gypsum that enables the formation of an interlocking matrix of set gypsum, thereby imparting strength to the gypsum structure in the gypsum-containing product. As the crystal matrix forms, the product slurry becomes firm and holds the desired shape.

After the wallboard preform is cut into segments downstream of the forming station at a point along the line where the preform has set sufficiently, the segments are flipped over, dried (e.g., in a kiln) to drive off excess water, and processed to provide the final wallboard product of desired dimensions. The aqueous foam produces air voids in the set gypsum, thereby reducing the density of the finished product relative to a product made using a similar slurry but without foam.

In general, the hydration rate can impact the final strength and production speed of the gypsum-containing product. Furthermore, in the process for making cementitious boards, the setting and drying steps are the most intensive in terms of time and energy. The setting time of the slurry depends on a number of factors, including the age of the calcined gypsum, impurities in the calcined gypsum, surface area, pH, particle size and the temperature at the time of mixing. Different additives and/or process condition changes can be employed to influence the hydration rate of the slurry to ensure that the cementitious board being produced is suitable for its intended purpose. Accordingly, it is desirable for an operator to determine the rate of set the cementitious slurry undergoes as it progresses along the line.

Conventionally, an operator at a cutting station, which is located downstream of the forming station at a position where the slurry is expected to have sufficiently set so that the wallboard preform can be cut into segments, uses a "thumb test" to periodically monitor the hydration rate (or set time) of the slurry. The thumb test comprises pushing one's thumb on the back of the board to feel how firm it is.

Also, it is known to monitor the temperature rise of the slurry as it sets. The reaction between the calcined gypsum and the water is an exothermic reaction in which the temperature of the slurry increases over time, eventually reaching a maximum temperature as the reaction moves toward completion. A temperature rise set (TRS) curve can be plotted which tracks temperature over time so that an operator can determine a hydration percentage for the slurry at various points along the machine line. However, obtaining temperature rise set data on a continuous basis can be difficult, including overcoming difficulties caused by ambient temperature or other influences.

There is a continued need in the art to provide additional solutions to enhance the production of gypsum panels. For example, there is a continued need for techniques for monitoring the set of cementitious slurry during the manufacture of cementitious board line. There is also a continued need for systems and methods for continuously monitoring the set of the cementitious slurry as the cementitious board is being made.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a system for manufacturing a cementitious board.

In another aspect of the present disclosure, embodiments of a method of manufacturing a cementitious board are described.

In one aspect, an embodiment of a system for manufacturing a cementitious board is described. The cementitious board has a cementitious core interposed between a pair of cover sheets. The cementitious core is formed from an aqueous cementitious slurry. The system includes a forming station, a conveyor, a board height measuring system, a non-transitory computer-readable medium, and a processor.

The forming station is configured to form the cementitious board such that the cementitious board is within a predetermined thickness range. The conveyor is configured to convey the cementitious board along a machine direction away from the forming station. The conveyor includes an upstream support surface and a downstream support surface. The upstream support surface and the downstream support surface both extend along the machine direction and a cross-machine direction. The cross-machine direction is perpendicular to the machine direction. The upstream support surface and the downstream support surface are in discontinuous relationship with respect to each other such that an unsupported span is defined therebetween along the machine direction over which the cementitious board is allowed to sag along a normal axis relative to a reference position. The reference position is disposed at one of the upstream support surface and the downstream support surface in offset relationship to the unsupported span along the machine direction. The normal axis is perpendicular to both the machine direction and the cross-machine direction.

The board height measuring system includes a reference height measuring device and a sag height measuring device. The reference height measuring device is disposed downstream of the forming station at the reference position. The reference height measuring device is configured to generate board reference height data corresponding to a reference height of a portion of the cementitious board as the cementitious board is conveyed past the reference height measuring device at the reference position. The sag height measuring device is disposed at a sag position within the unsupported span along the machine direction. The sag height measuring device being configured to generate board sag height data corresponding to a sag height of the portion of the cementitious board as the cementitious board is conveyed past the sag height measuring device at the sag position.

The non-transitory computer-readable medium bears a board measurement program. The processor is in operable arrangement with the board height measuring system to receive the board reference height data and the board sag height data. The processor is in operable arrangement with the non-transitory computer-readable medium such that the processor is configured to execute the board measurement program contained thereon. The board measurement program includes a height analysis module configured to compare the corresponding board reference height data and the board sag height data to determine a height difference between the reference height and the sag height for a particular portion of the cementitious board.

In another aspect, an embodiment of a method of manufacturing a cementitious board is described. In the method, the cementitious board is conveyed along a machine direction away from a forming station. The cementitious board has a cementitious core interposed between a pair of cover sheets. The cementitious core comprises an aqueous cementitious slurry. The cementitious board extends along the machine direction and along a cross-machine direction. The cross-machine direction is perpendicular to the machine direction.

The cementitious board is conveyed over an unsupported span downstream of the forming station. The unsupported span extends along the machine direction. Sag distance data are determined that relates to a sag distance that a portion of the cementitious board deflects as it travels over the unsupported span. The sag distance is measured along a normal axis. The normal axis is perpendicular to the machine direction and to the cross-machine direction.

The sag distance data are transmitted to a processor. A board measurement program stored upon a non-transitory computer-readable medium is executed using the processor to generate a numerical value relating to a board characteristic based upon the sag distance for a particular portion of the cementitious board.

Further and alternative aspects and features of the disclosed principles will be appreciated from the following detailed description and the accompanying drawings. As will be appreciated, the systems and techniques for measuring the degree to which cementitious slurry has set during the manufacture of a cementitious article that are disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

Figure 1:
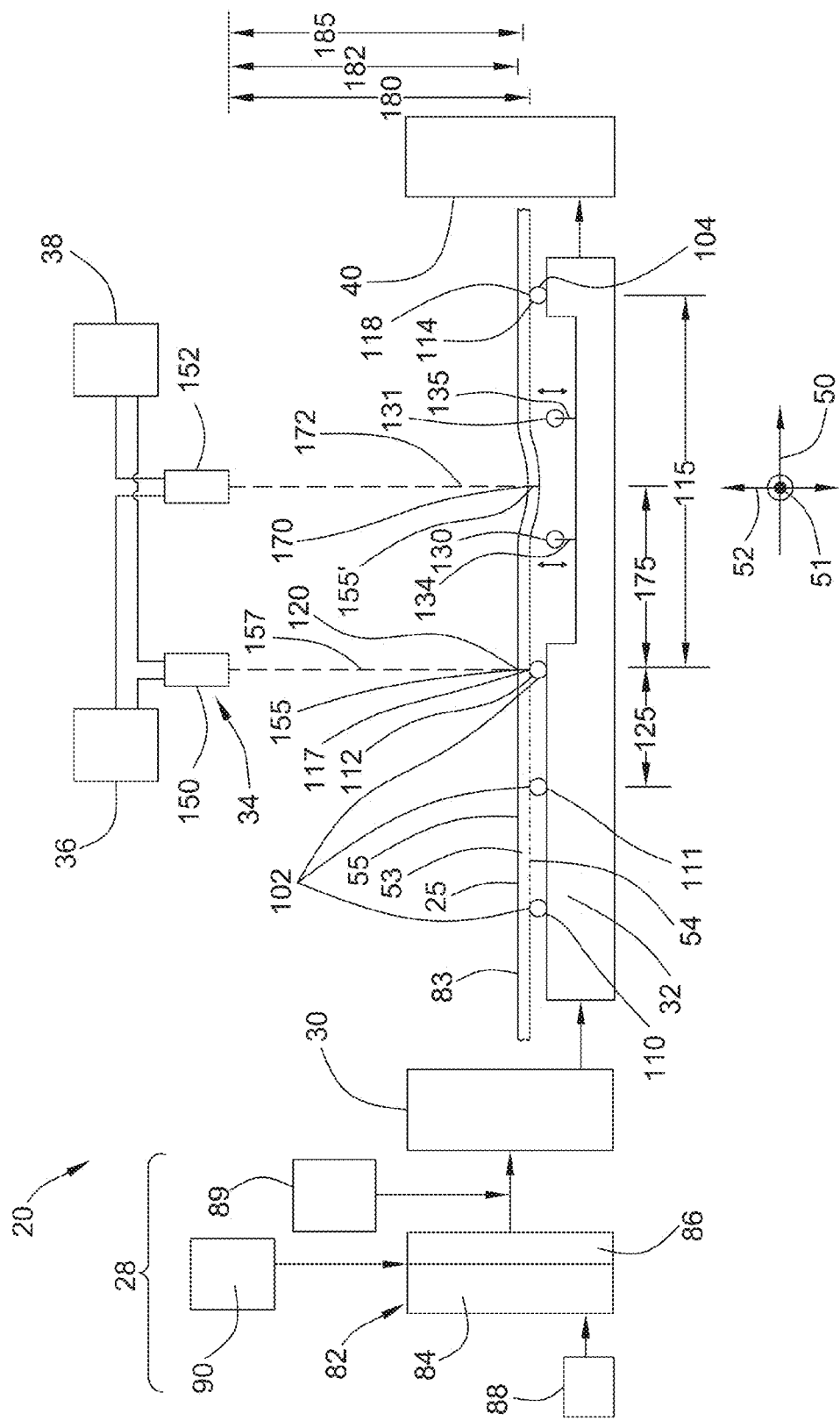
FIG. 1 is a fragmentary, schematic elevational view of an embodiment of a system for manufacturing a cementitious board made from an aqueous cementitious slurry in the form of a gypsum wallboard manufacturing line which is constructed in accordance with principles of the present disclosure, the system including an embodiment of a system for measuring set in the aqueous cementitious slurry at a location along the manufacturing line which is constructed in accordance with principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF EXEMPLARY EMBODIMENTS

The present disclosure provides various embodiments of a system and a method for continuously measuring cementitious board during the continuous manufacture thereof that can be used in connection with the manufacture of various cementitious products, including gypsum wallboard, for example. Embodiments of a system and a method for continuously measuring cementitious board during its continuous manufacture following principles of the present disclosure can be used online in a continuous manufacturing process to effectively determine the degree to which cementitious slurry has set (e.g., expressed as percent hydration) at a predetermined location, such as, near a cutting station, for example, without contacting the cementitious board. In embodiments, the system can be configured to issue an operator alert when a target percent hydration range is not satisfied.

In embodiments following principles of the present disclosure, the cementitious board is conveyed across an unsupported span at a predetermined location positioned along a machine direction between the forming station and the cutting station. A board height measuring system is configured to measure the relative sag of the cementitious board as it travels across the unsupported span. In embodiments, a pair of distance gauges can be used to determine the relative sag distance. In embodiments, a board measurement program stored upon a non-transitory computer-readable medium is executed by a processor to correlate sag distance data continuously fed to the processor by the board height measuring system with a value of percent hydration of the cementitious slurry of the particular portion of the cementitious data corresponding to the sag distance data.

Embodiments of a system and a method for measuring set in aqueous cementitious slurry at a predetermined location along a manufacturing line during continuous manufacture of cementitious board that follow principles of the present disclosure can be used to continuously and automatically measure board set. In embodiments, the continuous values for cementitious slurry set generated using principles of the present disclosure can be used to help a line operator control the quality of the board being made and/or help control the quality of the cut made at the cutting station.

In one embodiment, a system for manufacturing a cementitious board constructed according to principles of the present disclosure includes a forming station, a conveyor, a board height measuring system, a non-transitory computer-readable medium, and a processor. The cementitious board has a cementitious core interposed between a pair of cover sheets. The cementitious core is formed from an aqueous cementitious slurry.

The forming station is configured to form the cementitious board such that the cementitious board is within a predetermined thickness range. The conveyor is configured to convey the cementitious board along a machine direction away from the forming station.

The conveyor defines an upstream support surface and a downstream support surface. The upstream support surface and the downstream support surface both extend along the machine direction and a cross-machine direction. The cross-machine direction is perpendicular to the machine direction. The upstream support surface and the downstream support surface are in discontinuous relationship with respect to each other such that an unsupported span is defined therebetween along the machine direction over which the cementitious board is allowed to sag along a normal axis relative to a reference position. The normal axis is perpendicular to both the machine direction and the cross-machine direction. The reference position is disposed at one of the upstream support surface and the downstream support surface in offset relationship to the unsupported span along the machine direction.

The board height measuring system includes a reference height measuring device and a sag height measuring device. The reference height measuring device is disposed downstream of the forming station at the reference position. The reference height measuring device is configured to generate board reference height data corresponding to a reference height of a portion of the cementitious board as the cementitious board is conveyed past the reference height measuring device at the reference position. The sag height measuring device is disposed at a sag position within the unsupported span along the machine direction. The sag height measuring device is configured to generate board sag height data corresponding to a sag height of the portion of the cementitious board as the cementitious board is conveyed past the sag height measuring device at the sag position.

The non-transitory computer-readable medium bears a board measurement program. The processor is in operable arrangement with the board height measuring system to receive the board reference height data and the board sag height data and is in operable arrangement with the non-transitory computer-readable medium to execute the board measurement program contained thereon. The board measurement program includes a height analysis module configured to compare the corresponding board reference height data and the board sag height data to determine a height difference between the reference height and the sag height for a particular portion of the cementitious board.

In embodiments, the reference height measuring device comprises a laser distance gauge, and the reference position is located at a leading roller defining a leading end of the unsupported span. The reference position is aligned with the leading roller along the machine direction. The reference height distance gauge can be configured to measure the thickness of the cementitious board of the portion of the cementitious board that is located directly over the leading roller. In embodiments, the sag height measuring device comprises a laser distance gauge, and the sag position is located at the midpoint of the unsupported span along the machine direction. The sag height distance gauge can be configured to measure the sag distance at the midpoint of the unsupported span.

In embodiments, the reference height distance gauge and the sag height distance gauge can be located at the same base height over the machine line. The sag distance can be computed by the processor by determining the difference between a sag distance measured by the sag height distance gauge and a reference distance measured by the reference height distance gauge. With this arrangement, the sag distance is determined as a relative difference computed from the two measurements and any variations in the nominal thickness of different products or thickness variances of the cementitious board of a given nominal thickness and/or type can be automatically accommodated on a continuous basis.

In embodiments, the unsupported span is located upstream of a cutting station housing a knife configured to periodically cut the cementitious board along the cross-machine direction into board segments of a predetermined length. In embodiments, a leading roller and a trailing roller define a leading end and a trailing end of the unsupported span moving in the machine direction. The relative height of the leading and trailing rollers with respect to each other can be carefully controlled and maintained. Furthermore, in embodiments, the distance along the machine direction separating the leading roller and the trailing roller can be adjusted to vary the length of the unsupported span to provide sag distance data that adequately correlates to a cementitious board set characteristic profile.

In embodiments, a movable support member can be supplied which is movable over a range of travel between a stowed position and a support position. In the support position, the movable roller is placed within the unsupported span such that the movable roller is in contacting relationship with the cementitious board as it travels over the movable roller. In the stowed position, the movable roller is in non-contacting relationship with the cementitious board as it travels across the unsupported span. In embodiments, the movable roller can be placed in the support position at board line start up such that a head end of the cementitious board can be conveyed across the span without cracking or otherwise creating a process upset. The movable roller can be retracted and placed in the stowed position once the cementitious board completely extends over the entire unsupported span. In embodiments, the movable roller can be moved to the support position when the set of the cementitious slurry in the board is not being evaluated by the system.

In one embodiment, a method of manufacturing a cementitious board includes conveying the cementitious board along a machine direction away from a forming station. The cementitious board has a cementitious core interposed between a pair of cover sheets. The cementitious core comprises an aqueous cementitious slurry. The cementitious board extends along the machine direction and along a cross-machine direction, which is perpendicular to the machine direction.

The cementitious board is conveyed over an unsupported span downstream of the forming station. The unsupported span extends along the machine direction.

Sag distance data relating to a sag distance that a portion of the cementitious board deflects as it travels over the unsupported span are determined. The sag distance is measured along a normal axis. The normal axis is perpendicular to the machine direction and to the cross-machine direction.

The sag distance data are transmitted to a processor. A board measurement program stored upon a non-transitory computer-readable medium is executed using the processor to generate a numerical value relating to a board characteristic based upon the sag distance for a particular portion of the cementitious board. In embodiments, the board measurement program is configured to correlate the sag distance for a particular portion of the cementitious board to a value of percent hydration of the aqueous cementitious slurry of the particular portion of the cementitious board.

Turning now to the Figures, an embodiment of a system 20 for manufacturing a cementitious board 25 constructed according to principles of the present disclosure is shown in FIG. 1. The illustrated system 20 includes a wet end system 28, a forming station 30, a conveyor 32, a board height measuring system 34, a controller 36, a processor 38 in operable arrangement with a non-transitory computer-readable medium bearing a board measurement program, and a cutting station 40.

The wet end system 28 and the forming station 30 are configured to mix and assemble constituent materials together such that a continuous cementitious board 25 having a predetermined nominal thickness is fed from the forming station 30 along the conveyor 32 in a machine direction 50 toward the cutting station 40.

Referring to FIG. 1, the cementitious board 25 has a cementitious core 53 interposed between a pair of cover sheets 54, 55. The cementitious core 53 is formed from an aqueous cementitious slurry. The cementitious board 25 has a pair of edges extending along the machine direction 50. The edges are disposed in lateral spaced relationship to each other along a cross-machine direction 51 which is perpendicular to the machine direction 50.

Referring to FIG. 1, the wet end system 28 can include any suitable equipment adapted to mix and/or assemble the constituent materials forming the cementitious board 25. In embodiments, the wet end system 28 is configured as a gypsum wallboard wet end system.

In embodiments, the wet end system 28 includes a cementitious slurry mixing and dispensing system 82 having a slurry mixer 84 in fluid communication with a slurry dispensing system 86. The slurry mixer 84 is adapted to agitate water and a cementitious material (such as, calcined gypsum, for example) to form aqueous cementitious slurry. Both the water and the cementitious material can be supplied to the mixer 84 via one or more inlets as is known in the art. In embodiments, any other suitable slurry additive can be supplied to the mixer 84 as is known in the art of manufacturing cementitious products. Any suitable mixer (e.g., a pin mixer as is known in the art and commercially available from a variety of sources) can be used.

In use, water and a cementitious material, such as calcined gypsum, for example, can be agitated in the mixer 84 to form aqueous cementitious slurry. In some embodiments, water and calcined gypsum can be continuously added to the mixer 84 in a water-to-calcined gypsum ratio from about 0.5 to about 1.3, and in other embodiments of about 0.9 or less.

The slurry dispensing system 86 is in fluid communication with the slurry mixer 84 and is configured to dispense a main flow of cementitious slurry from the slurry mixer 84 upon a forming table extending between the cementitious slurry mixing and dispensing system 82 and the forming station 30. In embodiments, the slurry dispensing system 86 can include a suitable discharge conduit, as is known in the art. The discharge conduit can be made from any suitable material and can have different shapes. In some embodiments, the discharge conduit can comprise a flexible conduit. Cementitious slurry can be discharged from the slurry dispensing system 86 in an outlet flow direction substantially along the machine direction 50.

One or more flow-modifying elements can be associated with the discharge conduit and adapted to modify the flow of aqueous cementitious slurry from the slurry mixer 84 through the discharge conduit 86. The flow-modifying element(s) can be used to control an operating characteristic of the flow of aqueous cementitious slurry. Examples of suitable flow-modifying elements include volume restrictors, pressure reducers, constrictor valves, canisters, etc., including those described in U.S. Pat. Nos. 6,494,609; 6,874,930; 7,007,914; and 7,296,919, for example.

It is further contemplated that other discharge conduits, including other discharge conduits with different slurry distributors or boots, can be used in other embodiments of a cementitious slurry mixing and dispensing system 82. For example, in other embodiments, the discharge conduit 86 can include at its terminal end a slurry distributor similar to one of those shown and described in U.S. Patent Application Nos. 2012/0168527; 2012/0170403; 2013/0098268; 2013/0099027; 2013/0099418; 2013/0100759; 2013/0216717; 2013/0233880; and 2013/0308411, for example. In some of such embodiments, the discharge conduit 86 can include suitable components for splitting a main flow of cementitious slurry into two flows which are re-combined in the slurry distributor.

A first roll 88 of cover sheet material is configured to be selectively dispensed such that the first cover sheet 54 is dispensed from the first roll 84 upstream of the slurry dispensing system 86 upon the forming table extending between the slurry mixer and dispensing system 82 and the forming station 30. A second roll 89 of cover sheet material is configured to be selectively dispensed such that the second cover sheet 55 is dispensed from the second roll 89 upon the forming table at a position between the slurry dispensing system 86 of the cementitious slurry mixing and dispensing system 82 and the forming station 30 over the first cover sheet 54 and the slurry dispensed from the slurry dispensing system 86. Gypsum board products are typically formed "face down" such that the first cover sheet 54 dispensed from the first roll 88 traveling over the forming table serves as the "face" cover sheet 54 of the finished cementitious board 25.

In embodiments, a foam injection system 90 can be arranged with at least one of the mixer 84 and the slurry dispensing system 86. The foam injection system 90 can include a foam source (e.g., such as a foam generation system configured as known in the art) and a foam supply conduit.

In embodiments, any suitable foam source can be used. Preferably, the aqueous foam is produced in a continuous manner in which a stream of a mix of foaming agent and water is directed to a foam generator, and a stream of the resultant aqueous foam leaves the generator and is directed to and mixed with the cementitious slurry. In embodiments, any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the slurry. Some examples of suitable foaming agents are described in U.S. Pat. Nos. 5,683,635 and 5,643,510, for example.

The aqueous foam supply conduit can be in fluid communication with at least one of the slurry mixer 84 and the slurry dispensing system 86. An aqueous foam from a source can be added to the constituent materials through the foam supply conduit at any suitable location downstream of the mixer 84 and/or in the mixer 84 itself to form a foamed cementitious slurry. In embodiments, the foam supply conduit is disposed downstream of the slurry mixer 84 and is associated with a main delivery trunk of the discharge conduit 86. In some embodiments, the aqueous foam supply conduit has a manifold-type arrangement for supplying foam to a plurality of foam injection ports defined within an injection ring or block disposed at a terminal end of the foam supply conduit and associated with the discharge conduit 86, as described in U.S. Pat. No. 6,874,930, for example. In embodiments, a flow-modifying element is disposed downstream of the foam injection body and the aqueous foam supply conduit relative to a flow direction of the flow of cementitious slurry from the mixer 84 through the discharge conduit 86.

In other embodiments, one or more foam supply conduits can be provided in fluid communication with the mixer 84. In yet other embodiments, the aqueous foam supply conduit(s) can be in fluid communication with the slurry mixer 84 alone. As will be appreciated by those skilled in the art, the means for introducing aqueous foam into the cementitious slurry in the cementitious slurry mixing and dispensing system 82, including its relative location in the system, can be varied and/or optimized to provide a uniform dispersion of aqueous foam in the cementitious slurry to produce board that is fit for its intended purpose.

In embodiments in which the cementitious slurry comprises gypsum slurry, one or both of the cover sheets 54, 55 can be pre-treated with a thin, relatively denser layer of gypsum slurry (relative to the gypsum slurry comprising the core), often referred to as a "skim coat" in the art, and/or hard edges, if desired. To that end, in embodiments, the mixer 84 can include a first auxiliary conduit that is adapted to deposit a stream of dense aqueous cementitious slurry that is relatively denser than the main flow of aqueous calcined gypsum slurry delivered to the discharge conduit 86 (i.e., a "face skim coat/hard edge stream").

In embodiments, a hard edge/face skim coat roller is disposed upstream of the slurry dispensing system 86 of the cementitious slurry mixing and dispensing system 82 and supported over the forming table such that the first cover sheet 54 being dispensed from the first roll 88 is disposed therebetween. The first auxiliary conduit can deposit the face skim coat/hard edge stream upon the first cover sheet 54 being dispensed from the first roll 88 upstream of the skim coat roller which is adapted to apply a skim coat layer to the moving first cover sheet 54 and to define hard edges at the periphery of the moving first cover sheet 54 by virtue of the width of the roller being less than the width of the moving first cover sheet 54 as is known in the art. Hard edges can be formed from the same dense slurry that forms the thin dense layer by directing portions of the dense slurry around the ends of the roller used to apply the dense layer to the first cover sheet 54.

In some embodiments, a back skim coat roller is disposed over a support element such that the second cover sheet 55 being dispensed from the second roll 89 is disposed therebetween. The mixer 84 can also include a second auxiliary conduit adapted to deposit a stream of dense aqueous calcined gypsum slurry that is relatively denser than the main flow of aqueous calcined gypsum slurry delivered to the discharge conduit 86 (i.e., a "back skim coat stream"). The second auxiliary conduit can deposit the back skim coat stream upon the moving second cover sheet 55 upstream (in the direction of movement of the second cover sheet 55) of the back skim coat roller that is adapted to apply a skim coat layer to the second cover sheet 55 being dispensed from the second roll 89 as is known in the art.

In other embodiments, separate auxiliary conduits can be connected to the mixer 84 to deliver one or more separate edge streams to the moving cover sheet. Other suitable equipment (such as auxiliary mixers) can be provided in the auxiliary conduits to help make the slurry therein denser, such as by mechanically breaking up foam in the slurry and/or by chemically breaking down the foam through use of a suitable de-foaming agent.

The skim coat rollers, the forming table, and the support element can all comprise equipment suitable for their respective intended purposes as is known in the art. The wet end system 28 can be equipped with other suitable equipment as is known in the art.

In use, the first cover sheet 54 is dispensed from the first roll 84 and moves along the machine direction 50. The cementitious slurry is discharged from the discharge conduit 86 upon the moving first cover sheet 54. The face skim coat/hard edge stream can be deposited from the mixer 84 at a point upstream of where the cementitious slurry is discharged from the discharge conduit 86 upon the moving first cover sheet 54 relative to the direction of movement of the first cover sheet 54 in the machine direction 50. A back skim coat stream (a layer of denser slurry relative to the main flow of cementitious slurry being discharged from the discharge conduit 86) can be applied to the second cover sheet 55 being dispensed from the second roll 89. The back skim coat stream can be deposited from the mixer 84 at a point upstream of the back skim coat roller relative to the direction of movement of the moving second cover sheet 55. In embodiments, aqueous foam or other agents can be added to the slurry comprising the face skim coat and/or back skim coat to reduce its density, but at a density that is greater than the foamed slurry dispensed from the discharge conduit.

The moving second cover sheet 55 can be placed upon the slurry deposited upon the advancing first cover sheet 54 to form a sandwiched wallboard preform that is fed to the forming station 30 to shape the preform to a desired thickness.

The forming station 30 is configured to form the cementitious board 25 such that the cementitious board 25 is within a predetermined thickness range. The forming station 30 can comprise any equipment suitable for its intended purpose as is known in the art.

The conveyor 32 is configured to convey the cementitious board 25 along the machine direction 50 away from the forming station 30. The conveyor 32 can be configured such that the edges of the cementitious board 25 extend in substantially parallel relationship with the machine direction 50. In embodiments, the conveyor 32 is configured such that it has a length, measured along the machine direction 50, sufficient to allow the cementitious slurry constituting the cementitious core 53 to adequately set before reaching the cutting station 40 such that the cementitious board 25 can be cut cleanly. The temperature of the cementitious slurry rises during the setting process, which is an exothermic reaction that generates heat.

The conveyor 32 defines an upstream support surface 102 and a downstream support surface 104. The upstream support surface 102 and the downstream support surface 104 both extend along the machine direction 50 and the cross-machine direction 51, which is perpendicular to the machine direction 50.

In the illustrated embodiment, the conveyor 32 includes a plurality of upstream support members 110, 111, 112—including a leading end support member 112—that defines the upstream support surface 102. In the illustrated embodiment, a trailing end support member 114 defines the downstream support surface 104. The upstream and downstream support members 110, 111, 112, 114 of the system 20 of FIG. 1 comprise rollers that are journaled for rotation.

In the illustrated embodiment, the upstream support surface 102 and the downstream support surface 104 are substantially aligned with each other along a normal axis 52. The normal axis 52 is perpendicular to both the machine direction 50 and the cross-machine direction 51. In embodiments, the downstream support surface 104 can be offset axially along the normal axis 52 with respect to the upstream support surface 102.

The upstream support surface 102 and the downstream support surface 104 are in discontinuous relationship with respect to each other such that an unsupported span 115 is defined therebetween along the machine direction 50. The leading end support member 112 of the upstream support surface 102 defines a leading end 117 of the unsupported span 115, and the trailing end support member 114 of the downstream support surface 104 defines a trailing end 118 of the unsupported span 115. The unsupported span 115 shown in FIG. 1 extends along the machine direction 50 between the leading end 117 and the trailing end 118. In the illustrated embodiment, the leading end support member 112 and the trailing end support member 114 are substantially aligned with each other along the normal axis 52. In other embodiments, the trailing end support member 114 can be offset from the upstream support member along the normal axis 52.

The unsupported span 115 is configured such that the cementitious board 25 is allowed to sag along the normal axis 52 relative to a reference position 120 as the cementitious board 25 moves over the unsupported span 115. In embodiments, the reference position 120 is disposed at one of the upstream support surface 102 and the downstream support surface 104 in offset relationship to the unsupported span 115 along the machine direction 50. In the illustrated embodiment, the reference position 120 is substantially aligned with the leading end support member 112 along the machine direction 50 at the leading end 117.

In embodiments, the length of the unsupported span 115 along the machine direction 50 can vary to achieve its intended purpose. For example, in embodiments, the length of the unsupported span 115 can be established based upon considerations, such as, the sensitivity of the board height measuring system 34, the velocity of the cementitious board 25 moving along the machine direction 50, and the type and/or thickness of the cementitious board 25 being produced, for example, in order to produce a range of sag distance data for a given product type that can be correlated to a board characteristic, such as a value of percent hydration of the aqueous cementitious slurry constituting the cementitious core 53.

In embodiments, the unsupported span 115 is at least equal to 1.5 times an upstream support member pitch distance 125 measured along the machine direction 50 between the leading end support member 112 and an adjacent upstream support member 111. In embodiments, a ratio of the unsupported span 115 to the upstream support member pitch distance 125 is two or more. In embodiments, a ratio of the unsupported span 115 to the upstream support member pitch distance 125 is in a range between 1.5 and 5.

In embodiments, a ratio of the unsupported span 115 to the width of the cementitious board (measured along the cross-machine direction) is two or less. In other embodiments, a ratio of the unsupported span 115 to the width of the cementitious board (measured along the cross-machine direction) is 1.5 or less, and is one or less in yet other embodiments.

In embodiments, the conveyor 32 includes at least one movable support member 130. The conveyor 32 illustrated in FIG. 1 includes two movable support members 130, 131. Each movable support member 130, 131 is movable over a range of travel between a stowed position and a support position. Each movable support member 130, 131 is offset along the normal axis 52 from both the upstream support surface 102 and the downstream support surface 104 when in the stowed position (as is shown in FIG. 1). Each movable support member 130, 131 is substantially aligned with the upstream support surface 102 along the normal axis 52 and disposed within the unsupported span 115 along the machine direction 50 when in the support position.

In the illustrated embodiment, the movable support members 130, 131 each comprises a roller element. The conveyor 32 further includes an actuator 134, 135 associated with each movable support member 130, 131. Each actuator 134, 135 is operably arranged with the roller element 130, 131 to selectively move (in this case axially along the normal axis 52) the roller element 130, 131 over the range of travel between the stowed position and the support position. In embodiments, the controller 36 is in operable arrangement with each of the actuators 134, 135. The controller 36 can be configured to operate the actuators 134, 135 to selectively move the roller elements 130, 131, respectively, over the range of travel between the stowed position and the support position.

In the support position, each movable support member 130, 131 is placed within the unsupported span 115 such that each movable support member 130, 131 supports the cementitious board 25 as it travels over the respective movable support member 130, 131 to help prevent the board 25 from sagging along the normal axis 52. In the illustrated embodiment, the movable support members 130, 131 In embodiments, the movable roller can be placed in the support position at board line start up such that a head end of the cementitious board can be conveyed across the span without cracking or otherwise creating a process upset.

In the stowed position, each movable support member 130, 131 is in non-contacting relationship with the cementitious board 25 as it travels across the unsupported span 115. Each movable support member 130, 131 can be retracted and placed in the stowed position once the cementitious board 25 completely extends over the entire unsupported span 115 after machine line startup. In embodiments, the movable support members 135, 137 can be moved to the support position when the cementitious board 25 is not being evaluated online by the height measuring system 34.

In the illustrated embodiment, two movable support members 130, 131 are in spaced relationship to each other along the machine axis 50 such that the support member pitch distance 125 is substantially maintained. In embodiments, the number and/or placement of the movable support members 130, 131 can be varied depending upon the length of the unsupported span 115 along the machine axis 50 and/or the nature of the cementitious product 25 being made (e.g., its nominal thickness). For example, in embodiments, a single movable support member can be provided substantially at a midpoint of the unsupported span 115 along the machine axis 50.

The illustrated board height measuring system 34 is disposed downstream of the forming station 30 along the machine direction 50 and is disposed between the forming station 30 and the cutting station 40. The board height measuring system 34 is in operable arrangement with the controller 36 and the processor 38. The board height measuring system 34 can be configured to operate, in response to receiving a command signal from the controller 36, to obtain substantially continuous board height data of successive, continuous portions of the cementitious board 25. The board height measuring system 34 can be configured to transmit the board height data it obtains to the processor 38, which is configured to use the board height data to determine sag distance data for the cementitious board 25 on a substantially continuous basis.

In embodiments, the board height measuring system 34 is configured to measure the relative sag distance ($\Delta H$ in FIG. 2) of the cementitious board 25, measured along the normal axis 52, as it passes across the unsupported span 115. In embodiments, the board height measuring system 34 can comprise any suitable device configured to generate board position data corresponding to the position of the cementitious board 25 along the normal axis 52.

In the illustrated embodiment shown in FIG. 1, the board height measuring system 34 includes a reference height measuring device 150 and a sag height measuring device 152. In embodiments, the reference height and sag height measuring devices 150, 152 can be configured to obtain relative height data for a particular portion of the cementitious board 25 as it moves along the machine direction 50. The cementitious board 25 can be conveyed by the conveyor 32 past the board height measuring system 34 such that reference and sag height data corresponding to a given portion 155 of the cementitious board 25 can be acquired by the board height measuring system 34 and transmitted to the board measurement processor 38. The board height measuring system 34 can be configured to transmit the height data to the processor 38 which can be configured to determine sag distance ($\Delta H$) data for the cementitious board 25 on a continuous basis using the relative height data from the board height measuring system 34.

The reference height measuring device 150 is disposed downstream of the forming station 30 at the reference position 120. The reference height measuring device 150 is configured to generate board reference height data corresponding to a reference height of a portion 155 of the cementitious board 25 as the cementitious board 25 is conveyed past the reference height measuring device 150 at the reference position 120. In the illustrated embodiment, the reference position 120 is located along the machine direction 50 at the upstream support surface 102. The reference position 120 is substantially aligned with the leading end support member 112 along the machine direction 50.

The illustrated board height measuring system 34 is configured to generate board reference height data corresponding to the portion 155 of the cementitious board 25 within a field of view 157 of the reference height measuring device 150 as the cementitious board 25 is conveyed from the forming station 30 along the machine direction 50 past the reference height measuring device 150 toward the unsupported span 115. In the illustrated embodiment, the field of view 157 of the reference height measuring device 150 comprises a line extending across the cementitious board 25 along the cross-machine direction 51.

The sag height measuring device 152 is disposed at a sag position 170 within the unsupported span 115 along the machine direction 50. In the illustrated embodiment, the sag height measuring device 152 is disposed downstream of the reference height measuring device 150 along the machine direction 50.

The illustrated board height measuring system 34 is configured to generate board sag height data corresponding to a portion 155' of the cementitious board 25 within a field of view 172 of the sag height measuring device 152 as the cementitious board 25 is conveyed across the unsupported span 115. In the illustrated embodiment, the sag position 170 is disposed substantially at a midpoint of the unsupported span 115 between the leading end support member 112 and the trailing end support member 114 along the machine direction 50. In the illustrated embodiment, the field of view 172 of the sag height measuring device 152 comprises a line extending across the cementitious board along the cross-machine direction 51.

The sag height measuring device 152 is configured to generate board sag height data corresponding to a sag height of the portion 155' of the cementitious board 25 as the cementitious board 25 is conveyed past the sag height measuring device 152 at the sag position 170. In embodiments, the upstream support surface 102 and the downstream support surface 104 are in discontinuous relationship with respect to each other such that the unsupported span 115 has a sufficient length along the machine direction 50 to allow the cementitious board 25 to sag at the sag position 170 along the normal axis 52 relative to the reference position 120 to allow the board height measuring system 34 to generate sag distance data that can be converted into a numerical value correlated to the degree of set of the aqueous cementitious slurry constituting the core 53 at a given portion of the cementitious board 25.

The illustrated reference height measuring device 150 and the sag height measuring device 152 are each configured to transmit, respectively, the board reference height data and the board sag height data to the processor 38 substantially continuously. In embodiments, the processor 38 is in operable communication with a line speed sensor and/or controller in order to receive a line speed signal therefrom. The board measurement program can be configured to use the line speed signal to help compare the reference height and the sag height of the same portion 155 of the cementitious board 25 rather than the different portions 155, 155' of the cementitious board 25 that are simultaneously passing through the respective fields of view 157, 172 of the reference height measuring device 150 and the sag height measuring device 152 at any given time during the continuous operation of the board line.

In embodiments, the reference height data and the sag height data can both include collection time data, as well. The board measurement program can use the line speed signal in conjunction with the measurement device separation distance 175, measured along the machine direction 50, and the time data to match the reference height and the sag height for a given portion 155 of the cementitious board 25.

In the illustrated embodiment, the reference height measuring device 150 and the sag height measuring device 152 each comprises a laser distance gauge. The reference height distance gauge 150 and the sag height distance gauge 152 are each suspended over the conveyor 32 along the normal axis 52 at a base height 180. The board reference height data includes a reference distance 182 between the base height 180 and the portion 155 of the cementitious board 25 as the cementitious board 25 is conveyed past the reference height distance gauge 150 at the reference position 120. Using the illustrated arrangement, the reference height distance gauge 150 can be configured to measure the thickness of the cementitious board 25 when the cementitious board 25 is located directly over the leading end support member 112. The board sag height data includes a sag distance 185 between the base height 180 and the portion 155' of the cementitious board 25 as the cementitious board 25 is conveyed past the sag height distance gauge 152 at the sag position 170.

In embodiments, the board measurement program can determine the sag distance for a given portion 155 by determining the difference between the sag distance 185 measured by the sag height distance gauge 152 and the reference distance 182 measured by the reference height distance gauge 150 for the same portion 155 at an earlier point in time. The sag distance is thus a relative difference computed from the two measurements and any variations in the nominal thickness of different products or natural variability for a given product can be automatically accommodated on a continuous basis.

Referring to FIG. 1, the controller 36 is in operable arrangement with the board height measuring system 34. In embodiments, the controller 36 is configured to selectively operate the board height measuring system 34 to generate board height data corresponding to a substantially continuous series of portions 155 of the cementitious board 25 as the cementitious board 25 passes by the board height measuring system 34 along the machine direction 50.

In embodiments, the controller 36 and/or processor 38 is arranged with a line speed sensor, such as through a board line processor configured to monitor and control the board line operations. The controller 36 and/or processor 38 can determine the time interval between a given portion 155 passing through the field of view 157 of the reference height measuring device 150 and the field of view 172 of the sag height measuring device 152 such that the board measurement program can determine a relative sag distance for a given portion 155 of the cementitious board 25.

In embodiments, the controller 36 can include a user input and/or interface device having one or more user actuated mechanisms (e.g., one or more push buttons, slide bars, rotatable knobs, a keyboard, and a mouse) adapted to generate one or more user actuated input control signals. In embodiments, the controller 36 can be configured to include one or more other user-activated mechanisms to provide various other control functions for the board height measuring system 34, such as, auto-focus, field of view adjustment, and/or various other features and/or parameters as will be appreciated by one skilled in the art. The controller 36 can include a display device adapted to display a graphical user interface. The graphical user interface can be configured to function as both a user input device and a display device in embodiments. In embodiments, the display device can comprise a touch screen device adapted to receive input signals from a user touching different parts of the display screen. In embodiments, the controller 36 can be in the form of a smart phone, a tablet, a personal digital assistant (e.g., a wireless, mobile device), a laptop computer, a desktop computer, or other type of device. In embodiments, the controller 36 and the processor 38 can comprise the same device or set of equipment.

The board measurement processor 38 is in operable arrangement with the board height measuring system 34 to receive the board height data and is in operable arrangement with the non-transitory, computer-readable medium to execute the board measurement program contained thereon. In the illustrated embodiment, the processor 38 is in operable arrangement with the board height measuring system 34 to receive the board reference height data and the board sag height data and is in operable arrangement with the non-transitory computer-readable medium to execute the board measurement program contained thereon. In embodiments, the board measurement program includes a height analysis module configured to compare the corresponding board reference height data and the board sag height data to correlate a height difference between the reference height and the sag height for a particular portion of the cementitious board to a value of percent hydration of the aqueous cementitious slurry of the particular portion of the cementitious board. The processor 38 can be configured to receive input signals from the controller 36, to send input control signals to the controller 36, and/or to send output information to the controller 36.

In embodiments, the board measurement processor 38 is configured to manipulate the board height data received from the board height measuring system 34, to convert that information into relative sag distance which can be stored in a data storage device operably arranged with the board measurement processor 38, and/or to correlate the relative sag distance data with another board characteristic, such as, the degree to which the cementitious slurry constituting the cementitious core 53 of a given portion of the cementitious board has set.

In embodiments, the board measurement processor 38 can comprise any suitable computing device, such as, a microprocessor, a mainframe computer, a digital signal processor, a portable computing device, a personal organizer, a device controller, a logic device (e.g., a programmable logic device configured to perform processing functions), a digital signal processing (DSP) device, or a computational engine within an appliance. In embodiments, the board measurement processor 38 includes one or more input devices (e.g., a keyboard and a mouse) and a display device.

The board measurement processor 38 can have one or more memory devices associated therewith to store data and information. The one or more memory devices can include any suitable type, including volatile and non-volatile memory devices, such as RAM (Random Access Memory), ROM (Read-Only Memory), EEPROM (Electrically-Erasable Programmable Read-Only Memory), flash memory, etc. In one embodiment, the board measurement processor 38 is adapted to execute programming stored upon a non-transitory computer readable medium to perform various methods, processes, and modes of operations in a manner following principles of the present disclosure.

In embodiments, the board measurement processor 38 is in operable communication with a data storage device which includes at least one database containing board characteristic data. In embodiments, the board measurement program can be configured to map the sag distance data generated from the board height measuring system 34 with the board characteristic data to correlate a particular sag distance value with a value for the board characteristic.

For example, in embodiments, the data storage device includes a database of values of percent hydration that were determined using historical temperature rise data for a given product type. In embodiments, the board measurement program can be configured to map the sag distance data generated from the board height measuring system 34 with the values of percent hydration that were determined using historical temperature rise data to correlate a particular sag distance value with a value for percent hydration of the cementitious slurry of the core 53 of the cementitious board 25 when it was at the sag position 170.

In embodiments, the database of historical temperature rise data can include temperature rise data organized by product type and by nominal product thickness. In embodiments, the temperature rise data can be acquired by any suitable technique known to one skilled in the art. For example, in embodiments, the temperature rise data can be acquired in periodic fashion using any one of a variety of known techniques to one skilled in the art.

For example, in embodiments, the temperature rise setting time is determined in accordance with CSA A82.20M 1977 Physical Testing of Gypsum Plasters, Section 5.3, herein incorporated by reference. Since hydration of calcined gypsum is an exothermic reaction, the temperature rise in the slurry from the initial mixing temperature is indicative of the degree of set in the cementitious slurry.

In other embodiments, the rate of hydration is evaluated on the basis of the "Time to 50% Hydration." Because the hydration of calcined gypsum to set gypsum is an exothermic process, the Time to 50% Hydration can be calculated by determining the midpoint of the temperature increase caused by the hydration and then measuring the amount of time required to generate the temperature rise, as is known to those skilled in the art. In some embodiments, the Time to 50% Hydration can be determined by pouring a cementitious slurry into a standardized cup, which is then placed into an insulated container made from closed-cell extruded polystyrene foam (e.g., Styrofoam®) to reduce heat transfer with the environment. A temperature probe is placed into the middle of the slurry, and the temperature is recorded every five seconds. Since the setting reaction is exothermic, the extent of the reaction can be measured by the temperature rise. The time to 50% hydration is determined to be the time to reach the temperature halfway between the minimum and maximum temperatures recorded during the test.

In still other embodiments, the temperature rise setting time is determined in accordance with ASTM C472-99, which is entitled, "Standard Test Methods for Physical Testing of Gypsum, Gypsum Plasters and Gypsum Concrete." ASTM C472 includes a procedure which uses a Vicat apparatus to test the level of setting of gypsum. The ASTM C472 procedure can be similarly used for any other cementitious slurry suitable for use with principles described herein. The Vicat apparatus uses a needle to penetrate cementitious material, the degree to which the needle penetrates the setting slurry correlates to the hydration percentage of the slurry. According to ASTM C472, the setting time is complete when the needle no longer penetrates to the bottom of the material.

In yet other embodiments, a continuous, real-time slurry temperature rise monitoring system can be provided along the machine direction 50 between the mixer 84 and the kiln, for example. In embodiments, any suitable slurry temperature rise monitoring system known to those skilled in the art can be used, such as, those commercially-available from Raytek Corp. of Santa Cruz, Calif., including the system marketed under the model name TRS100, for instance.

In embodiments, the continuous, real-time slurry temperature rise monitoring system includes a series of infrared sensors disposed in spaced relationship to each other along the board line. Each infrared sensor can be configured to detect infrared radiant energy (heat) and convert the detected thermal energy values into an electronic signal, which is then processed to produce thermal data for the cementitious board as it travels along the machine direction. In embodiments, an infrared sensor is aligned with each of the reference position 120 and the sag position 170. In embodiments, at least one infrared sensor is disposed between the mixer 84 and the forming station 30 along the machine direction 50. In embodiments, at least one infrared sensor is disposed between the cutting station 40 and a dryer (e.g., a kiln) along the machine direction 50.

The processor 38 can execute a thermal processing program stored on a non-transitory computer-readable medium to generate a time/temperature graph representing the rise/set temperatures from the infrared sensors of the slurry temperature rise monitoring system. The thermal processing program can also be configured to store time/temperature data representing the rise/set temperatures of cementitious slurry for a given product type and nominal thickness in the data storage device for use by the board measurement program. In embodiments, the slurry temperature rise monitoring system can include sensors for monitoring the board line speed, ambient air temperature at each infrared sensor, the board formulation recipe, and pre-defined process parameters, for example.

In embodiments, a board measurement program following principles of the present disclosure can be configured to implement an embodiment of a method for manufacturing cementitious board according to principles of the present disclosure. In embodiments, the board measurement program includes a graphical user interface that can be displayed by the display device. The graphical user interface can be used to facilitate the inputting of commands and data by a user to the board measurement program and to display outputs generated by the board measurement program.

The board measurement program can be stored upon any suitable computer-readable storage medium. For example, in embodiments, a board measurement program following principles of the present disclosure can be stored upon a hard drive, floppy disk, CD-ROM drive, tape drive, zip drive, flash drive, optical storage device, magnetic storage device, and the like.

In embodiments, the board measurement program includes a height analysis module configured to compare the corresponding board reference height data and the board sag height data to determine a height difference (or sag distance) between the reference height and the sag height for a particular portion of the cementitious board. In embodiments, the sag distance data can be displayed by the board measurement program via the graphical user interface as a substantially continuous time/sag distance graph displayed by the display device. In embodiments, an operator can set a predetermined tolerance range for the sag distance, and the board measurement program can be configured to operate an alarm if the sag distance falls outside of the tolerance range. In embodiments, the alarm can be any suitable alarm including an audible signal and/or a warning message displayed via the graphical user interface on the display device.

In embodiments, the board measurement program is configured to correlate the sag distance data it receives from the board measurement system 34 to a value of percent hydration of the aqueous cementitious slurry of a particular portion of the cementitious board. In embodiments, the correlated sag distance data can be displayed by the board measurement program via the graphical user interface as a substantially continuous time/percent hydration graph displayed by the display device.

In embodiments, the height analysis module is configured to compute a sag difference as the difference between the corresponding sag distance and the reference distance for a given portion as sensed by the reference height measuring device and the sag height measuring device, respectively, and to correlate the sag difference for a particular portion of the cementitious board to a value of percent hydration of the aqueous cementitious slurry of the particular portion of the cementitious board. In embodiments, the height analysis module is configured to determine the value of percent hydration of the aqueous cementitious slurry of the particular portion of the cementitious board using the database of values of percent hydration. In other embodiments, the height analysis module is configured to determine the value of percent hydration of the aqueous cementitious slurry of the particular portion of the cementitious board using a conversion formula including sag distance as a part of the formula.

Referring to FIG. 1, the cutting station 40 is disposed downstream of the forming station 30 along the machine direction 50. The cutting station 40 is arranged with respect to the conveyor 32 such that the conveyor 32 carries the cementitious board 25 past the cutting station 40. The cutting station 40 can include a knife configured to periodically cut the cementitious board 25 along the cross-machine direction 51 to define a series in board segments as the cementitious board 25 moves along the machine direction 50 past the cutting station 40. In embodiments, the knife can be a rotary knife as are generally known to those skilled in the art.

In embodiments, the controller 36 can be configured to control the operation of the rotary knife of the cutting station. In embodiments, the controller 36 can adjust the rotational speed of the rotary knife based upon the line speed of the board line (as detected by a suitable sensor, for example) to produce board segments of substantially the same length under different line speed conditions.

In embodiments, the system 20 for manufacturing a cementitious board 25 can include other components and stations. For example, in embodiments, the system 20 can include a transfer system, including a board inverter; a kiln; and a bundler and taping station, all downstream of the cutting station 40.

In embodiments, the unsupported span 115 is located upstream of the cutting station 40. The board height measuring system 34 is disposed along the machine direction 50 between the forming station 30 and the cutting station 40.

Figure 2:
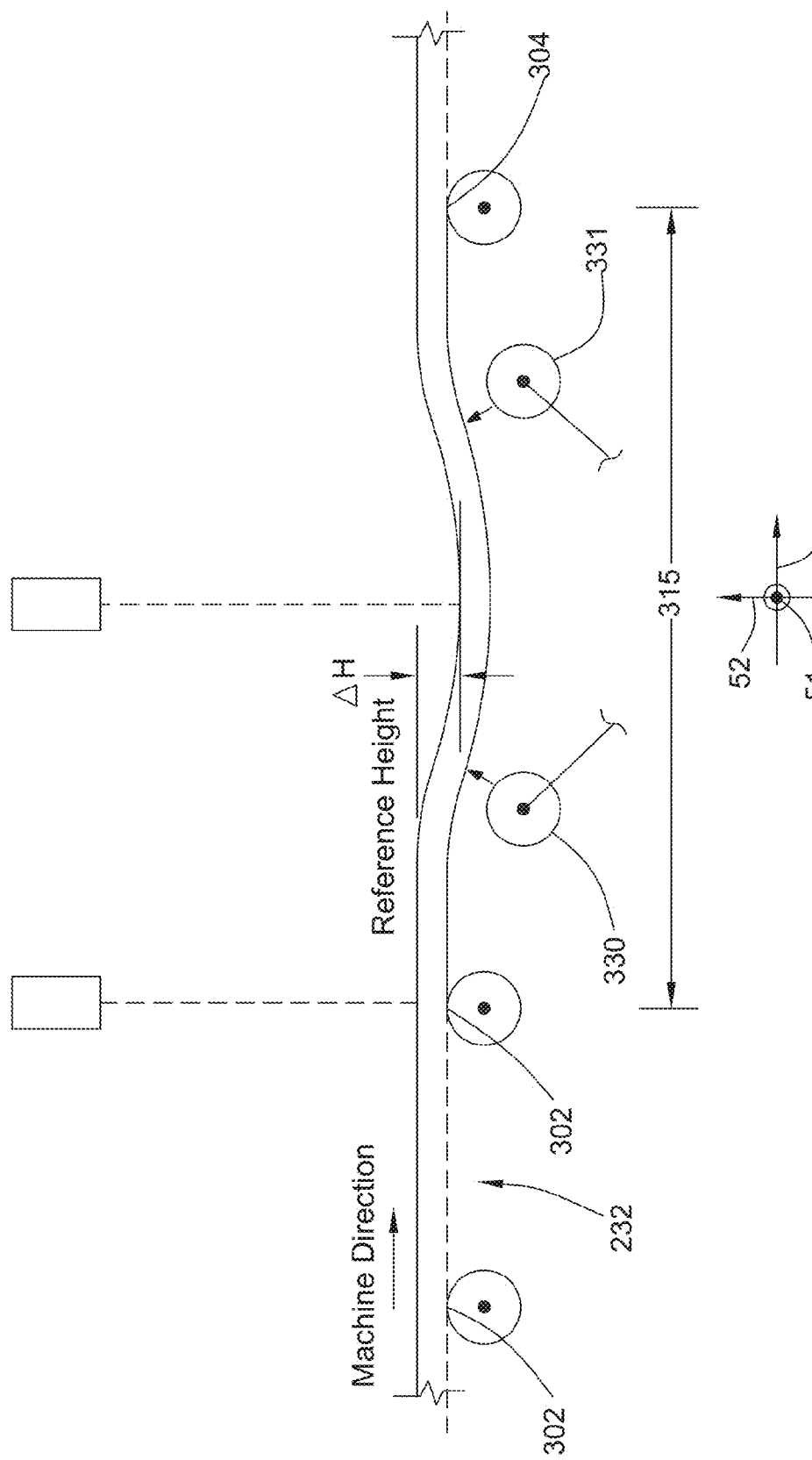
FIG. 2 is a fragmentary, schematic view of an exemplary embodiment of a conveyor section suitable for use in a system for manufacturing a cementitious board following principles of the present disclosure, illustrating a pair of movable support members in a stowed position.
Figure 3:
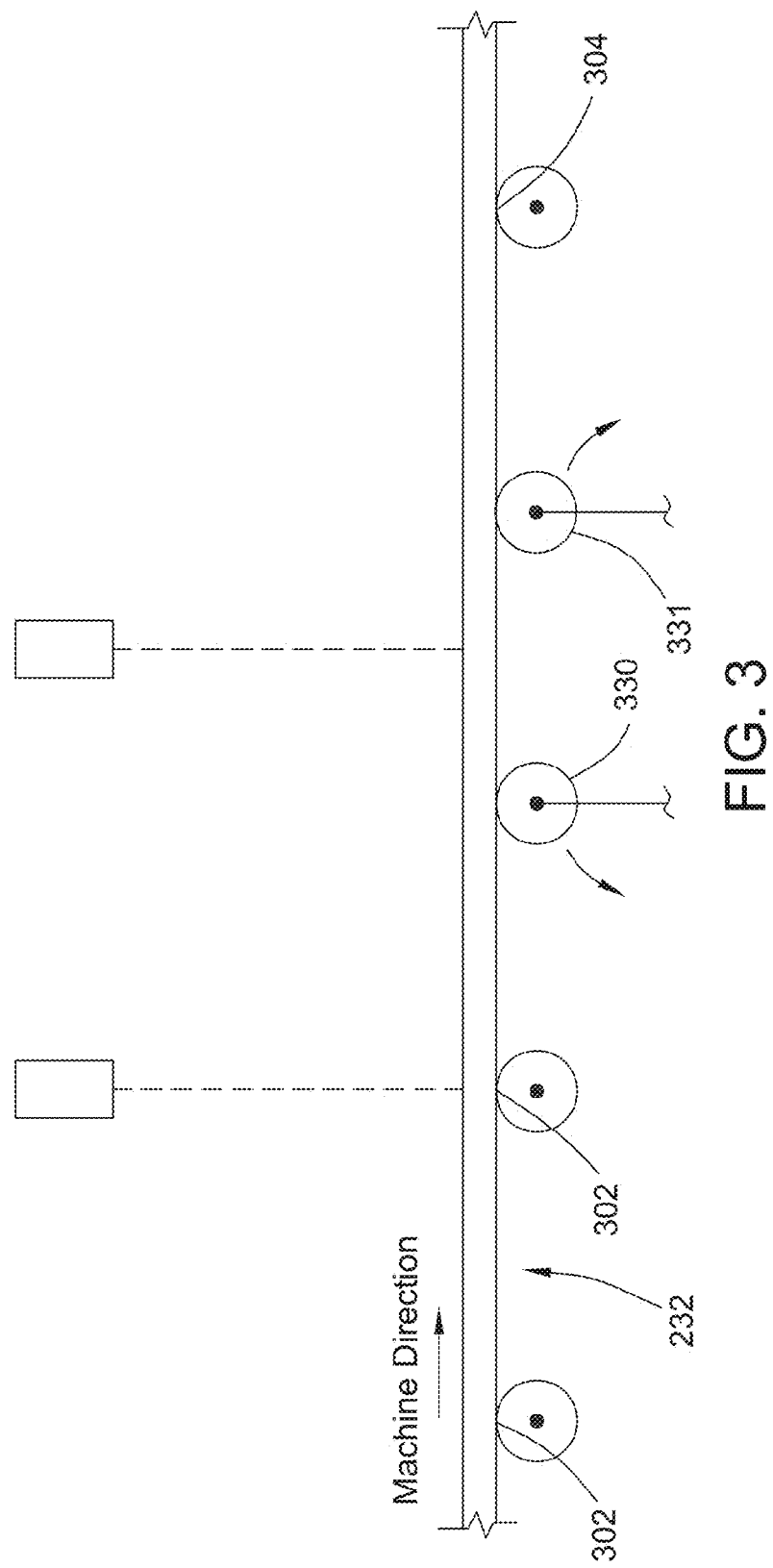
FIG. 3 is a view as in FIG. 2, illustrating the movable support members in a support position.

Referring to FIGS. 2 and 3, an embodiment of a conveyor 232 suitable for a system for manufacturing cementitious board according to principles of the present disclosure is shown. The conveyor 232 includes two movable support members 330, 331 that can be selectively moved within an unsupported span 315 defined by an upstream support surface 302 and a downstream support surface 304 of the conveyor 232 which are in discontinuous relationship with each other along the machine direction 50. Each movable support member 330, 331 is movable over a range of travel between a stowed position and a support position. Each movable support member 330, 331 is offset along the normal axis 52 from both the upstream support surface 302 and the downstream support surface 304 when in the stowed position (as is shown in FIG. 2). Each movable support member 330, 331 is substantially aligned with the upstream support surface 302 along the normal axis 52 and disposed within the unsupported span 315 along the machine direction 50 when in the support position (as shown in FIG. 3).

In the illustrated embodiment, the movable support members 330, 331 each comprises a roller element. The conveyor 232 further includes an actuator associated with each movable support member 330, 331. Each actuator is operably arranged with the roller element 330, 331 to selectively move (in this case rotationally as indicated by the arrows in FIGS. 2 and 3) the roller element 330, 331 over the range of travel between the stowed position and the support position. In embodiments, a controller can be configured to operate the actuators to selectively move the roller elements 330, 331, respectively, over the range of travel between the stowed position and the support position. The movable support members 330, 331 are similar in other respects to the movable support members 130, 131 of FIG. 1.

Figure 4:
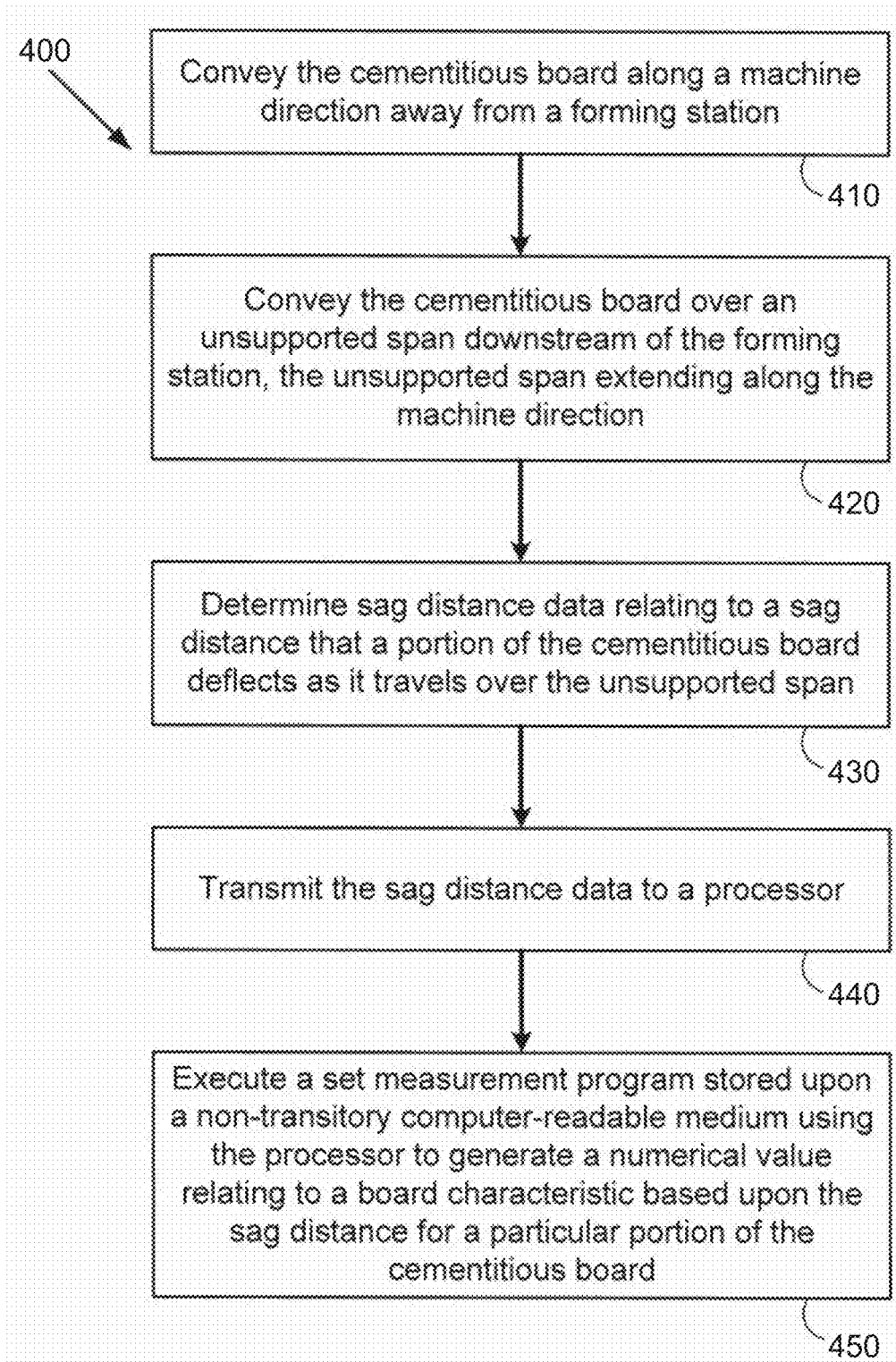
FIG. 4 is a flowchart illustrating steps of an embodiment of method of manufacturing a cementitious board following principles of the present disclosure.

In embodiments of a method of manufacturing a cementitious board following principles of the present disclosure, a system for measuring set in aqueous cementitious slurry according to principles of the present disclosure is used to determine the degree to which cementitious slurry within the cementitious board is set in an on-line manner during the continuous manufacture of the cementitious board. Referring to FIG. 4, steps of an embodiment of a method 400 of manufacturing a cementitious board following principles of the present disclosure are shown. In embodiments, a method of manufacturing a cementitious board following principles of the present disclosure can be used with any embodiment of a system for measuring set in aqueous cementitious slurry according to principles discussed herein.

The illustrated method 400 of manufacturing a cementitious board includes conveying the cementitious board along a machine direction away from a forming station (step 410). The cementitious board has a cementitious core interposed between a pair of cover sheets. The cementitious core comprises an aqueous cementitious slurry. The cementitious board extends along the machine direction and along a cross-machine direction, which is perpendicular to the machine direction. The cementitious board has a pair of edges in lateral spaced relationship to each other along the cross-machine direction. The edges of the cementitious board extend along the machine direction.

The cementitious board is conveyed over an unsupported span downstream of the forming station (step 420). The unsupported span extends along the machine direction.

Sag distance data relating to a sag distance that a portion of the cementitious board deflects as it travels over the unsupported span are determined (step 430). The sag distance is measured along a normal axis. The normal axis is perpendicular to the machine direction and to the cross-machine direction. The sag distance data are transmitted to a processor (step 440).

A board measurement program stored upon a non-transitory computer-readable medium is executed using the processor to generate a numerical value relating to a board characteristic based upon the sag distance for a particular portion of the cementitious board (step 450). In embodiments, the board measurement program is configured to correlate the sag distance for a particular portion of the cementitious board to a value of percent hydration of the aqueous cementitious slurry of the particular portion of the cementitious board. In embodiments, the sag distance data are determined substantially continuously and are transmitted to the processor substantially continuously.

In embodiments of a method of manufacturing a cementitious board following principles of the present disclosure, the board measurement program stored upon the non-transitory computer-readable medium is executed using the processor includes displaying, through a graphical user interface, the value of percent hydration of the aqueous cementitious slurry of the particular portion of the cementitious board in a display device. In embodiments, an operator may use the sag distance directly as the numerical value relating to the board characteristic (in this case, sag resistance). In other embodiments, the board measurement program is configured to correlate the sag distance data with corresponding values for the percent hydration of the aqueous cementitious slurry of the particular portion of the cementitious board. In embodiments, the board measurement program can be in operable relationship with a data storage device configured to receive sag distance data and board characteristic data based upon the sag distance data on a continuous basis from the processor.

In embodiments of a method of manufacturing a cementitious board following principles of the present disclosure, a support member is moved into a support position within the unsupported span along the machine direction such that the support member is placed in supporting relationship with the cementitious board. In embodiments, the support member is moved into a stowed position such that the support member is placed in non-contacting relationship with the cementitious board.

In embodiments of a method of manufacturing a cementitious board following principles of the present disclosure, the cementitious board is periodically cut to define a series of board segments as the cementitious board moves along the machine direction past a cutting station, which is disposed downstream of the forming station along the machine direction. In embodiments, the unsupported span is disposed along the machine direction between the forming station and the cutting station.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for manufacturing a cementitious board, the cementitious board having a cementitious core interposed between a pair of cover sheets, the cementitious core formed from an aqueous cementitious slurry, the system comprising:
   a forming station, the forming station configured to form the cementitious board such that the cementitious board is within a predetermined thickness range;
   a conveyor, the conveyor configured to convey the cementitious board along a machine direction away from the forming station, the conveyor including an upstream support surface and a downstream support surface, the upstream support surface and the downstream support surface both extending along the machine direction and a cross-machine direction, the cross-machine direction being perpendicular to the machine direction, the upstream support surface and the downstream support surface in discontinuous relationship with respect to each other such that an unsupported span is defined therebetween along the machine direction over which the cementitious board is allowed to sag along a normal axis relative to a reference position, the reference position being disposed at one of the upstream support surface and the downstream support surface in offset relationship to the unsupported span along the machine direction, the normal axis being perpendicular to both the machine direction and the cross-machine direction;
   a board height measuring system, the board height measuring system including a reference height measuring device and a sag height measuring device, the reference height measuring device disposed downstream of the forming station at the reference position, the reference height measuring device being configured to generate board reference height data corresponding to a reference height of a portion of the cementitious board as the cementitious board is conveyed past the reference height measuring device at the reference position, and the sag height measuring device disposed at a sag position within the unsupported span along the machine direction, the sag height measuring device being configured to generate board sag height data corresponding to a sag height of the portion of the cementitious board as the cementitious board is conveyed past the sag height measuring device at the sag position;

a non-transitory computer-readable medium, the non-transitory computer-readable medium bearing a board measurement program; and a processor, the processor in operable arrangement with the board height measuring system to receive the board reference height data and the board sag height data, the processor in operable arrangement with the non-transitory computer-readable medium such that the processor is configured to execute the board measurement program contained thereon;

wherein the board measurement program includes a height analysis module configured to compare the corresponding board reference height data and the board sag height data to determine a height difference between the reference height and the sag height for a particular portion of the cementitious board.

2. The system for manufacturing according to claim 1, wherein the upstream support surface and the downstream support surface are substantially aligned with each other along the normal axis.

3. The system for manufacturing according to claim 1, wherein the conveyor includes at least one movable support member, each movable support member movable over a range of travel between a stowed position and a support position, the movable support member being offset along the normal axis from both the upstream support surface and the downstream support surface when in the stowed position, and the movable support member being substantially aligned with the upstream support surface along the normal axis and disposed within the unsupported span when in the support position.

4. The system for manufacturing according to claim 3, wherein the movable support member comprises a roller element, and the conveyor further includes an actuator, the actuator operably arranged with the roller element to selectively move the roller element over the range of travel between the stowed position and the support position, the system further comprising:

a controller, the controller in operable arrangement with the actuator, the controller configured to selectively operate the actuator to selectively move the roller element over the range of travel between the stowed position and the support position.

5. The system for manufacturing according to claim 1, wherein the reference height measuring device and the sag height measuring device are each configured to transmit, respectively, the board reference height data and the board sag height data to the processor substantially continuously.

6. The system for manufacturing according to claim 1, wherein the reference height measuring device and the sag height measuring device each comprises a laser distance gauge.

7. The system for manufacturing according to claim 6, wherein the reference height distance gauge and the sag height distance gauge are each disposed over the conveyor along the normal axis at a base height, wherein the board reference height data includes a reference distance between the base height and the portion of the cementitious board as the cementitious board is conveyed past the reference height distance gauge at the reference position, and wherein the board sag height data includes a sag distance between the base height and the portion of the cementitious board as the cementitious board is conveyed past the sag height distance gauge at the sag position.

8. The system for manufacturing according to claim 7, wherein the height analysis module is configured to compute a sag difference as the difference between the corresponding sag distance and the reference distance and to correlate the sag difference for a particular portion of the cementitious board to a value of percent hydration of the aqueous cementitious slurry of the particular portion of the cementitious board.

9. The system for manufacturing according to claim 8, further comprising:

a data storage device, the data storage device in operable communication with the processor, the data storage device including a database of values of percent hydration that are correlated to a series of different values for sag difference, the values of percent hydration determined using historical temperature rise data;

wherein the height analysis module is configured to determine the value of percent hydration of the aqueous cementitious slurry of the particular portion of the cementitious board using the database of values of percent hydration.

10. The system for manufacturing according to claim 1, wherein the reference position is located along the machine direction at the upstream support surface, and wherein the conveyor includes includes a leading end support member, the leading end support member adjacent the unsupported span, and wherein the reference position is substantially aligned with the leading end support member along the machine direction.

11. The system for manufacturing according to claim 10, wherein the conveyor includes a trailing end support member disposed adjacent the unsupported span downstream thereof, the sag position disposed substantially midway between the leading end support member and the trailing end support member along the machine direction.

12. The system for manufacturing according to claim 1, further comprising:

a cutting station, the cutting station disposed downstream of the forming station along the machine direction, the cutting station arranged with respect to the conveyor such that the conveyor carries the cementitious board past the cutting station, the cutting station including a knife configured to periodically cut the cementitious board along the cross-machine direction to define a series of board segments as the cementitious board moves along the machine direction past the cutting station.

13. The system for manufacturing according to claim 12, wherein the board height measuring system is disposed along the machine direction between the forming station and the cutting station.

14. A method of manufacturing a cementitious board, the method comprising:

conveying the cementitious board along a machine direction away from a forming station, the cementitious board having a cementitious core interposed between a pair of cover sheets, the cementitious core comprising an aqueous cementitious slurry, the cementitious board extending along the machine direction and along a cross-machine direction, the cross-machine direction perpendicular to the machine direction;

conveying the cementitious board over an unsupported span downstream of the forming station, the unsupported span extending along the machine direction;

determining sag distance data relating to a sag distance that a portion of the cementitious board deflects as it travels over the unsupported span, the sag distance measured along a normal axis, the normal axis being perpendicular to the machine direction and to the cross-machine direction;

transmitting the sag distance data to a processor;

executing a board measurement program stored upon a non-transitory computer-readable medium using the processor to generate a numerical value relating to a board characteristic based upon the sag distance for a particular portion of the cementitious board.

15. The method of manufacturing according to claim 14, wherein the sag distance data are determined substantially continuously and are transmitted to the processor substantially continuously.

16. The method of manufacturing according to claim 14, wherein the numerical value of the board characteristic based upon the sag distance corresponds to a value of percent hydration of the aqueous cementitious slurry of the particular portion of the cementitious board.

17. The method of manufacturing according to claim 16, wherein executing the board measurement program stored upon the non-transitory computer-readable medium using the processor includes displaying, through a graphical user interface, the value of percent hydration of the aqueous cementitious slurry of the particular portion of the cementitious board in a display device.

18. The method of manufacturing according to claim 14, further comprising:

moving a support member into a support position within the unsupported span along the machine direction such that the support member is placed in supporting relationship with the cementitious board.

19. The method of manufacturing according to claim 18, further comprising:

moving the support member into a stowed position such that the support member is placed in non-contacting relationship with the cementitious board.

20. The method of manufacturing according to claim 14, further comprising:

periodically cutting the cementitious board to define a series of board segments as the cementitious board moves along the machine direction past a cutting station, the cutting station disposed downstream of the forming station along the machine direction;

wherein the unsupported span is disposed along the machine direction between the forming station and the cutting station.

* * * * *